INVENTORS
Harvey C. Nathanson
Robert A. Wickstrom

United States Patent Office 3,672,985
Patented June 27, 1972

3,672,985
CONDUCTOR ELEMENTS SPACED FROM MICROELECTRONIC COMPONENT SURFACE AND METHODS OF MAKING THE SAME
Harvey C. Nathanson and Robert A. Wickstrom, Pittsburgh, Pa., assignors to Westinghouse Electric Corporation, Pittsburgh, Pa.
Application May 31, 1968, Ser. No. 733,581, which is a division of application Ser. No. 465,090, June 18, 1965, now Patent No. 3,413,573. Divided and this application May 5, 1970, Ser. No. 34,807
Int. Cl. B44d 1/14
U.S. Cl. 117—212
9 Claims

ABSTRACT OF THE DISCLOSURE

A microelectronic component is provided with a conductive member having one or more extremities affixed to and supported by a substrate, such as an integrated circuit, and an extended portion from an extremity that is, or between two extremities that are, in permanently fixed spaced relation, substantially parallel to the substrate without intervening support material. The conductive member may be used for various purposes such as for the vibratory member of a resonant gate transistor or a conductive bridge crossing over elements of an integrated circuit. The conductive member may be formed by a method including use of a spacer layer in the position of the extended portion for deposition thereof followed by removal of the spacer layer.

CROSS REFERENCE TO RELATED APPLICATION

This application is a division of copending application Ser. No. 733,581, filed May 31, 1968 which in turn was a division of application Ser. No. 465,090, filed June 18, 1965, which is now U.S. Patent 3,413,573.

BACKGROUND OF THE INVENTION

Field of the invention

This invention relates to microelectronic components requiring conductive members interconnecting elements thereof and for other purposes, and methods of making the same.

Considerable subject matter of the above referred to copending application relates particularly to devices including conductors spaced from a substrate surface for use as vibratory members. To avoid unnecessary repetition, much of that subject matter is omitted herein and the parent application should be referred to for further description with respect thereto.

DESCRIPTION OF THE PRIOR ART

In early semiconductor integrated circuits the technique of selectively interconnecting internally isolated device portions was by means of thermocompression bonding of fine wire. This type of connection was susceptible to failure by reason of bonds of low strength sometimes occurring. The wires were also by reason of their high flexibility susceptible to forces tending to make them move into contact with the substrate and each other causing shorting.

A subsequent technique, and that widely used on integrated circuits to the present time, has been to provide metal interconnects directly on an insulating layer covering the surface except where ohmic contacts are required. High reliability can be achieved by this technique; it does, however, impose restrictions on the location of interconnections because only a single plane is available.

To provide greater choice of interconnection patterns, important an integrated circuits become more complex, diffused crossunders and, also, a second layer interconnect pattern on and spaced from the first layer by an insulating layer have been used. Diffused crossunders impose geometric limitations on the internal semiconductor structure as well as possible circuit degradation due to parasitic capacitance. Multiple layer interconnects have been found difficult and costly to make with sufficiently good insulation between the levels.

Some description of prior art interconnections may be found by reference to Microelectronics, Keonjian, Editor, McGraw-Hill Book Company, 1963, pages 309 and 310.

SUMMARY OF THE INVENTION

This invention has among its objects to permit a high degree of diversity in integrated circuit components by providing highly relable, readily fabricated, permanently fixed conductve members in spaced relation and substantially parallel to the surface without intervening support material. The insulating qualities of air or other suitable gaseous atmosphere is much better than that of most solid insulators, is not susceptible to pinholing, and creates no fabrication problems. The conductive member may provide a conductive bridge between two portions of an integrated circuit or be a frequency selective vibratory member. The bridge can cross over elements of an integrated circuit that are directly on the surface with sure insulation between them.

The method of the invention, applicable to conductive elements for various purposes such as tuning elements in a resonant gate transistor and crossovers, employs techniques thoroughly compatible with those employed in the batch fabrication of semiconductor integrated circuits. The method includes forming a pattern of material on the surface that includes a spacer layer between the surface and the position to be taken by the spaced conductor. Conductive material is deposited in the positions of all portions of the conductive member, including one or more extremities affixed to and supported by the substrate. Selective removal of the spacer layer leaves remaining the fixed spaced conductor.

DESCRIPTION OF THE PREFERRED EMBODIMENTS

Figure 1:
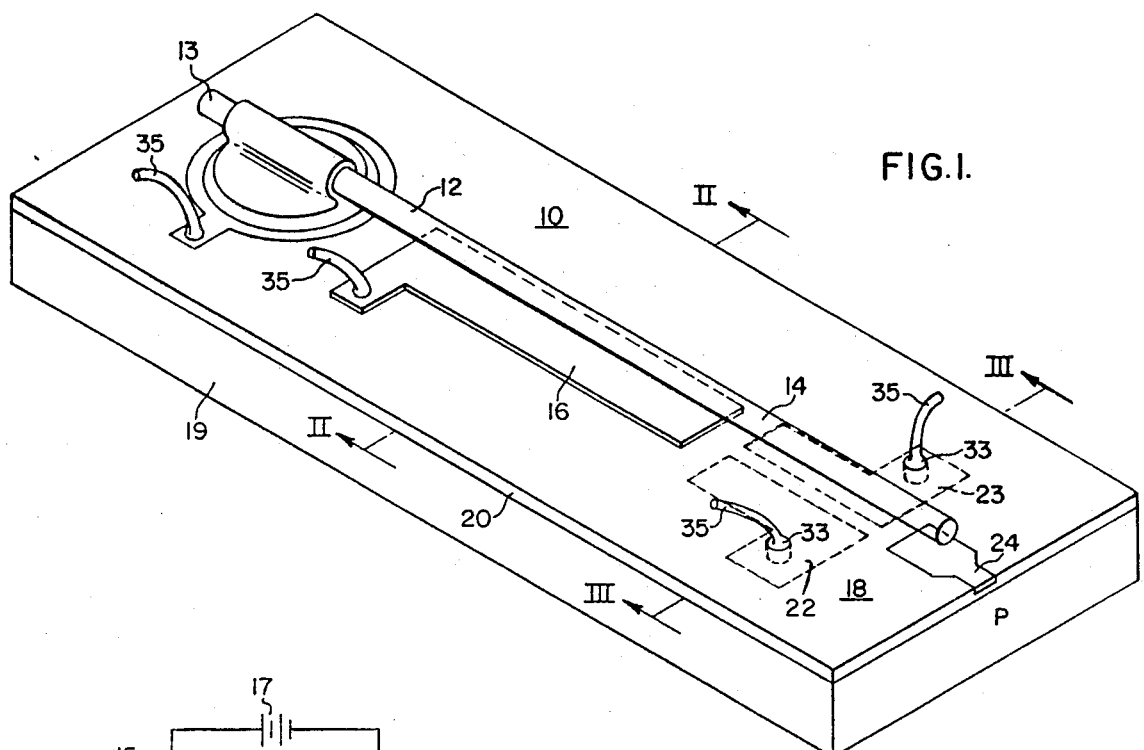
FIG. 1 is a perspective view of one embodiment of the present invention.
Figure 2:
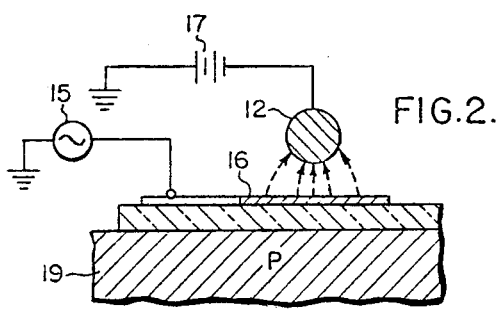
FIGS. 2 and 3 are sectional views taken, respectively, along lines II—II and III—III of FIG. 1 with additional circuit elements shown schematically.
Figure 3:
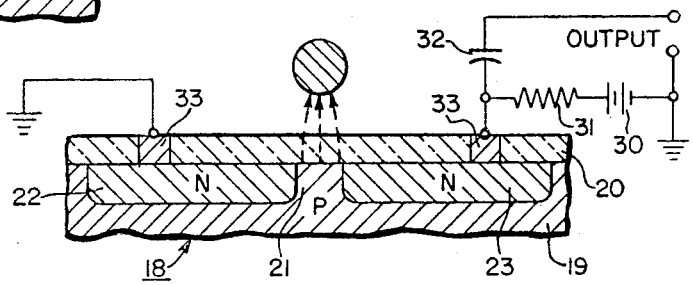

Referring to FIGS. 1, 2 and 3, an exemplary form of the present invention is illustrated that comprises a substrate 10, a vibratory member 12 including a first portion 13 affixed to the substrate and a second portion 14 free to move over the substrate. At least the second portion 14 of the vibratory member 12 comprises electrically conductive material. A means for establishing a variable electric field including a contact 16 on the substrate 10 to which an AC signal may be applied by source 15 (FIG. 2) causes the vibratory member to vibrate at the frequency of the applied signal. The vibratory member 12 preferably is polarized by a DC source 17. The polarity of source 17 may be positive or negative.

The vibration of member 12 affects a means on the substrate that produces a variable electrical response determined by the position of the vibratory member. For this purpose a surface potential controlled transistor 18 is disposed on the substrate under the second portion 14 of the vibratory member 12. Some means for electrical isolation through the substrate between the vibratory member 12 and the responsive means is provided. The surface potential controlled transistor 18 may be any whose characteristics are affected by a potential or field at the surface thereof. The discussion herein will be primarily directed to devices where the transistor is a field effect transistor with an insulating layer over its channel.

The substrate 10 in this example comprises a body 19 of semiconductive material such as silicon on which there is disposed a layer 20 of insulating material such as a silicon dioxide that besides serving the usual purposes of stabilizing the semiconductor surface also serves as the above-mentioned means for electrical isolation. The vibratory member 12 and contact 16 are insulated from the semiconductive material 19 by the oxide layer 20 that is relatively thick (e.g. about 2,000 to 10,000 angstroms). Thus the illustrated structure may be part of a semiconductor integrated circuit that includes in other portions additional resonant gate transistors or other functional elements in accordance with known semiconductor integrated circuit technology. In the case in which the substrate is of silicon it is of course, preferred to form the responsive element 18, the surface potential controlled transistor, within the silicon.

In this example, the transistor 18 comprises a pair of semiconductive regions 22 and 23 of semiconductivity type opposite to that of the immediately adjacent material. The bulk material of semiconductive substrate 19 is of p-type semiconductivity, the regions 22 and 23 are of n-type and may provide respectively source and drain regions of a known type of device. An ohmic contact 33 is affixed to each of the regions 22 and 23. The conductance of the channel 21, that portion of the substrate between the source and drain regions, may be modulated by variations in the field at the surface overlying the channel region. Since the rod 12 is polarized negatively in this example, the transistor operates in a depletion mode. It could, alternatively, be polarized positively for accumulation mode operation.

In conventional surface potential controlled transistors of the field effect type the channel conductance modulation is achieved by signals applied to a contact or electrode disposed directly on the oxide. There is no need for such a contact or electrode in the practice of the present invention. That is because the polarization and signal potentials on the vibratory member 12 create in themselves an electric field that influences the channel.

FIGS. 2 and 3 shows a few lines of force of the electric fields between rod 12 and plate 66 and between rod 12 and the channel 21 of transistor 18, respectively, for the illustrated example. The vibration of member 12 causes variation in the field strength in the channel. The transistor 18 is supplied by a source of potential 30 through a load 31. The output may, for example, be taken from across the load 31, through a capacitor 32 for DC isolation, and applied to a subsequent amplifier stage or used directly by a utilization device. For making the necessary electrical connections, individual leads 35 are affixed to the vibratory member 12, the contact 16, and the ohmic contacts 33. Often the output of the transistor 18 will be applied to a bipolar transistor in the same integrated circuit for more gain.

In this example, the vibratory member 12 is a cantilever, that is (a member of appreciable rigidity affixed at only one end to the substrate. Such members have particular resonant frequencies of vibration to which they can be excited, where comprised of conductive material, by electrostatic means. This is achieved, in this example, by the contact 16, that may sometimes be referred to as a force plate, that underlies most of the length of the cantilever 12 to which a signal may be applied at a resonant frequency of the member 12. The force plate 16 may be omitted with the signal applied directly to the beam 12 although that is not preferred. When the signal is applied directly to the beam 12, it is fed through to the transistor regardless of frequency with, however, a peak amplitude at resonance. Using the force plate 16 for applying the signal, with the beam 12 at AC ground, insures that only the resonant frequency is exhibited by the transistor output.

Several alternatives to the form of the invention shown in FIGS. 1, 2 and 3 are to be noted although such alternatives are mentioned merely by way of further example and are not intended to exhaust the possible arrangement of the invention.

The substrate, of course, need not be a body of semiconductive material. Among the other possibilities are for it to be a body of an insulator such as ceramic employed as a substrate in a thin film integrated circuit in which case the responsive element could be a thin film transistor of known type disposed on the ceramic member or a separately fabricated surface potential controlled transistor mounted thereon but without electrostatic shielding.

The vibratory member 12 need not be a cantilever. It may, for example, be a plate, a diaphragm or rod mounted at two ends.

The responsive means itself need not be as shown since any of a variety of known surface potential controlled electronic elements may be employed. For example, the responsive means may be a junction bipolar transistor having the vibratory member positioned over, for example, the emitter-base junction.

An additional contact 24 is shown on the oxide layer 20 under the extreme extremity of the beam 12. This is merely to illustrate another degree of flexibility with devices in accordance with the present invention. In addition to providing a gate element for the surface potential controlled transistor, the vibratory member 12 may act as a relay if designed to respond to vibration with such amplitude that it will contact the element 24 and act as a switch closing a circuit.

As an example, a low frequency, about 2,000 cycles per second, high Q resonant gate transistor was made substantially as shown in FIG. 1 with, however, the signal applied directly to rod 12. The starting material was of p-type silicon on which by conventional oxide masking and diffusion techniques source and drain regions 22 and 23 were formed by diffusion to produce a surface controlled transistor of the inversion layer type with a channel length, that is, the spacing between the source and drain regions, of 6.0 microns.

After the diffusion operations, during which the surface of the source and drain regions was reoxidized, contact windows were opened where desired for the source and drain contacts and an aluminum layer of about 2,000 angstroms thickness was evaporated over the entire surface followed by an evaporated silver layer of a thickness of about 2,000 angstroms. The purpose of the aluminum was to make good ohmic contact to the diffused regions. The purpose of the silver was to permit the secure mounting of a cantilever on the device.

Following the metal evaporation steps, the silver-aluminum layed was selectively etched away leaving contacts on the source and drain regions and a mounting pad on the oxide surface where the cantilever was to be mounted. The mounting pad had a diameter of about 20 mils. Next, a layer of a masking material having a thickness selected to be that desired for the spacing of the cantilever from the device surface in the undeflected position was formed followed by a second layer of masking material that had an opening at the position of the cantilever. The first layer used for spacing the rod was of a photoresist material sold under the trade name KMER photoresist in a thickness of about ½ mil and the second layer was of the same material having a thickness of about ¼ mil. These layers serve to hold the rod parallel to the oxide surface and in the right alignment during soldering of the cantilever. The cantilever was an annealed tungsten wire with circular cross-section having one mil diameter plated with about 2 microns of gold to facilitate soldering. It was cut to a length of 120 mils and placed in the alignment slot. A 20 mil diameter by 1 mil thick indium-lead-tin solder pellet, having a melting point of about 160° C., was placed between the silver pad and the wire end. The structure was fired at 185° C. for about 20 seconds to weld the rod end to the silver pad. The layer of masking material was then removed and the device tested.

The preferred method of fabricating spaced conductors on a substrate in accordance with this invention generally comprises the steps of forming on a substrate a first mask having an opening where the mounting of the cantilever is to be made. The first mask, conveniently of a commercially available photoresist material, does not have an opening that extends along the position the free portion of the beam is to take. In that position, the first mask has a thickness equal to that desired for the spacing of the beam from the substrate surface. Thereafter a second mask is formed, either with or without fabricating some part of the beam itself prior thereto. The second mask, also preferably of a photoresist material, has an opening in the position of the cantilever mounting and along the position to be taken by the free portion of the beam. A cantilever is formed by deposition of metal in the mentioned openings and the masks are removed, as by conventional stripping solvents.

The description in connection with the making of a device as in FIG. 1 includes one example of this method. However, in order to avoid handling separate rods and fastening them to a substrate, it is preferred to form the vibratory member from metal deposited by evaporation or plating or both as in the immediately following description.

Figure 4A:
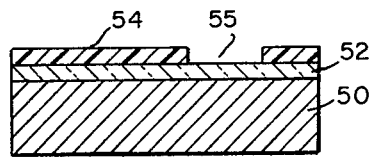
FIGS. 4A through 4G are partial sectional views illustrating, at successive stages, the fabrication of a vibratory member on a semiconductor substrate.
Figure 5A:
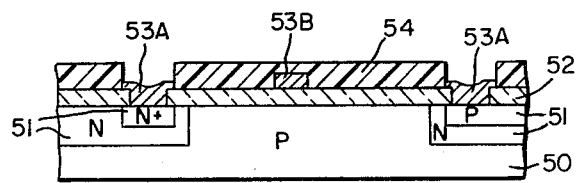
FIGS. 5A through 5G are partial sectional views illustrating, at successive stages, the fabrication of another form of the invention.

In FIGS. 4A through 4G there is shown a method of producing a cantilever for use in the present invention by thin film techniques that are compatible with those employed in integrated circuit fabrication. FIG. 4A shows a silicon substrate 50 with a layer 52 of insulating material such as silicon dioxide thereon to which there has been applied a layer of a masking material 54 having an opening 55 at the position desired to fix the beam to the substrate. The masking material 54 is conveniently one of the commercially available negative photoresist materials, That is, the photoresist is one that becomes insoluble where exposed so that the opening formed on developing it has a slightly gradually increasing diameter toward the top of the layer. Vertical evaporation of a continuous metal film is thus possible. The thickness of mask 54 is selected in accordance with the desired spacing of the ultimate beam from the surface of the oxide layer 52.

Figure 4B:
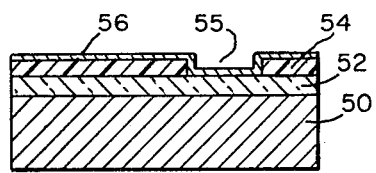
Figure 5B:
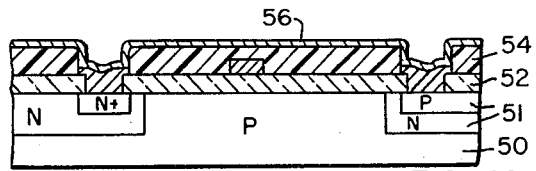

FIG. 4B shows the structure after there has been formed over the entire upper surface a continuous metal layer 56 that adheres well within the opening 55 to the oxide layer 50 and furthermore has a surface amenable to the ready disposition of additional material thereon. The metal layer may be formed, for example, by first evaporating a layer of chromium to a thickness of about 750 angstroms and then a layer of gold to a thickness of about 1500 angstroms.

Figure 4C:
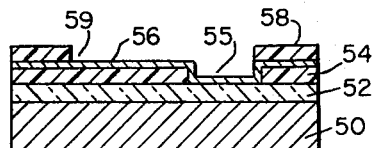

FIG. 4C shows the structure after a second layer of masking material 58 has been formed on top of the metal layer. This masking material is in a pattern such that there is an opening 59 where the beam is to be affixed to the oxide and also in the position where the beam is to extend over the oxide. This layer 58 may also be formed of a commercially available photoresist material.

Figure 4D:
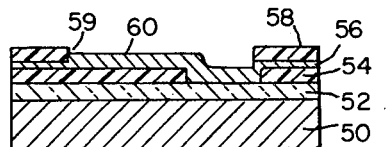
Figure 5D:
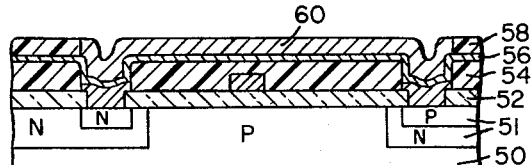

FIG. 4D shows a structure after additional metal 60 has been deposited within opening 59 to the desired thickness of the ultimate beam. This may be performed by the plating of a metal such as gold using standard gold plating techniques.

Figure 4E:
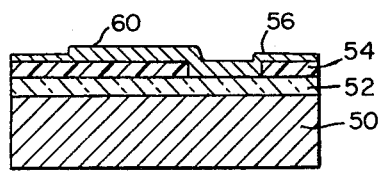
Figure 5E:
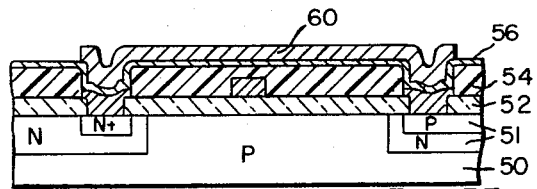

FIG. 4E illustrates the structure after the second layer of masking material 58 has been removed by using a known type of solvent.

Figure 4F:
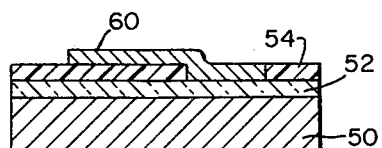
Figure 5F:
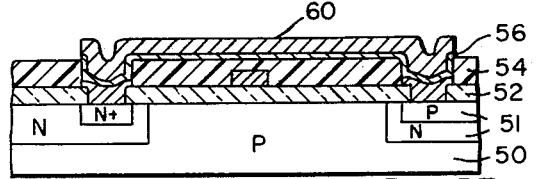

FIG. 4F shows the structure after the unprotected first layer of metal 56 has been removed as by etching. The etching operation is not continued substantially beyond the removal of the first metal layer so that it does not appreciably effect the thickness of the plated metal 60.

Figure 4G:
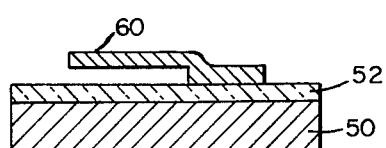

FIG. 4G shows the ultimate structure after the first photoresist layer 54 has been removed by an appropriate solvent. Cantilever 60 is affixed at one end to the oxide layer 52 with its other end free to vibrate.

Following is a detailed specific example in keeping with FIGS. 4A to 4G. This process may be performed after all the diffusion operations and electrical contacts have been formed on a semiconductor integrated circuit by conventional techniques. The oxidized slice is "degreased" to prepare the ovide to accept the chromium layer by submerging it in boiling trichloroethylene for ten minutes, followed by a five minute double-distilled methyl alcohol boil and heat lamp dry.

The thick photoresist spacer layer 54 with appropriate holes 55 is formed by placing the slice on a resist spinner and covering it with a coating of fresh undiluted KMER photoresist (available from Eastman Kodak Co.) using an eyedropper. The slice is then spun first at a low speed (about 1000 r.p.m.) for 15 seconds, an intermediate speed for 10 seconds and a high speed (about 3500 r.p.m.) for 5 seconds. The initial low speed essentially determines the ultimate thickness of the layer, while the last 5 second high-speed spin removes the outside photoresist lip that usually forms when spinning undiluted KMER photoresist at low speed. After spinning, the slice is baked out at 90° C. in air for 30 minutes. This process forms a resist layer of about 5 microns thickness. If additional thickness is required, a bake-out of 15, rather than 30 minutes is employed, and the above process is repeated, resulting in a layer 10 microns thick. Final bake-out is 30 minutes at 90° C. in air.

The photoresist layer is exposed through a suitable optical mask under a xenon lamp for 30 seconds, and spray developed. The photoresist windows are then inspected under 400× dark field illumination to make sure all KMER photoresist has been removed from the windows so as to permit good chromium adhesion to the oxide. A final 15 minute, 150° C. postbake is then employed.

The slice is placed in a conventional high vacuum system. A 750 angstrom chrome layer followed by a 1500 angstrom gold layer is evaporated, without opening the system inbetween the deposition of layers. The metals are evaporated slowly, using a quartz-microbalance to measure film thickness. Conventional tungsten evaporation boats are employed. After evaporation, layers are inspected for cracking, and other defects.

A positive-working photoresist, available under the trademark Positop from Shipley Co. Inc., Wellesley, Mass. is sprayed onto the surface of the slice over the chrome-gold to a thickness of about 2 microns. The slice is immediately transferred on a glass slide in a horizontal position to a pre-bake furnace where it is heated at 90° C. in air for 30 minutes. The positive photoresist is exposed through an appropriate optical mask using a 10 sec. xenon lamp followed by a 10 minute mercury lamp exposure. The resist image is then dipped, then spray developed and rinsed. After a 400× dark field inspection, the resist layer is postbaked for 15 min. at 150° C. in air.

A contact is affixed to the thin gold layer 56 and the slice submerged in a gold plating solution of about pH 7. A 12 micron layer of gold is electrolytically plated up in the regions of the slice not covered by the mask 58. The final gold deposit is examined for smoothness, graininess etc. under 400× magnification.

After plating, the mask 58 is stripped in a spray of acetone. The thin gold layer 56 is removed in a 50% solution of aqua regia at 25° C. The thin chrome layer is removed using a saturated solution of potassium ferricyanide made basic to a pH of 8–10 in NaOH and heated to 60° C. The slice is then submerged in a solution of a commercial KMER photoresist stripper called J100 (Indust.-Ri-Chem, Richardson, Tex.) held at 100° C.±5° C. for 15 minutes. This removes the underlying KMER photoresist layer and frees the beam. The slice is then rinsed first in boiling, then 25° C. deionized $H_2O$ and force air dried. The finished cantilevers are inspected for parallelness with the $SiO_2$ surface.

Devices constructed using this process have been tested. Center frequencies of about 3000 c.p.s. with Q's over 100 have been observed in a number of devices. In addition, multiple cantilever 7 structures have been fabricated using this method.

Cantilevers 38 mils long by 1 mil wide and ½ mil thick with a uniform ½ mil spacing from the silicon dioxide surface have been made by this process with excellent results. The technique described is also useful for producing conductive bridges between two portions of an integrated circuit or the like, such as "crossovers."

FIGS. 5A through 5G show the application of the method of FIGS. 4A through 4% to making crossovers. Like reference numerals are employed where appropriate. The integrated circuit 50 may include various regions 51 formed by any of the known techniques. In accordance with well known prior art, an insulating layer 52 is formed into a contact mask having openings where contacts are to be made and the contacts 53A and first interconect layer 53B are formed by metallization and selective removal. Interconnect 53B is entirely on layer 52 and would, as in ordinary practice, connect two other ohmic contacts. The process proceeds with the application of layer 54 and subsequent steps as described above in connection with FIGS. 4A through 4G.

Figure 5C:
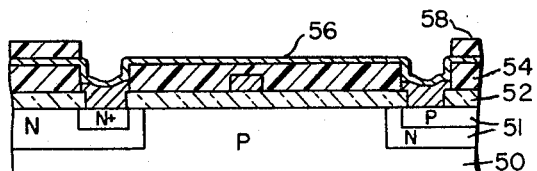
Figure 5G:
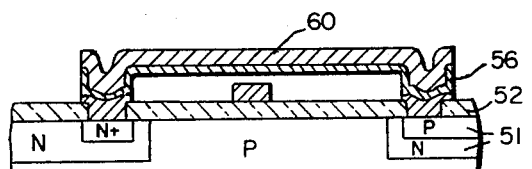

It is to be noted that a key feature of the methods in accordance with this invention is the formation of a pattern of material on the substrate surface that includes a spacer layer between the surface and the position to be taken by the spaced conductor. FIGS. 4C and 5C show structures at this stage wherein part of layers 54 and 56 act as the spacer layer. Layer 58 defines the pattern for deposition of metal, as in FIGS. 4D and 5D, to form the conductive member which appears as shown in FIGS. 4G and 5G after removal of the spacer and masks.

While the present invention has been shown and described in a few forms only it will be understood that various changes and modifications may be made without departing from the spirit and scope thereof.

We claim as our invention:

1. A method of forming a conductive member on a substrate having a first portion affixed to said substrate and a second portion uniformly spaced from the surface of said substrate comprising the steps of: forming a first mask on said surface having a first opening where said first portion of said member is to be affixed and having a uniform thickness underlying the position to be taken by said second portion of said member; forming a second mask overlying said first mask and having a second opening where said first portion of said member is to be affixed with said opening also extending in the position to be taken by said second portion of said member; depositing metal in said first and second openings; removing said first and second masks.

2. A method in accordance with claim 1 wherein: said substrate comprises a body of semiconductive material with a layer of insulating material on the surface thereof; and said first and second masks are formed of photoresist material.

3. A method of forming a vibratory member on a substrate comprising: forming a first layer of a masking material on a substrate surface, said layer having an opening at a position at which said vibratory member is to be mounted on said substrate; depositing a layer of metal over said layer and within said opening; forming a second layer of a masking material over said metal layer, said second layer having an opening at said position at which said vibratory member is to be mounted on said substrate and at the position over which said vibratory member extends; depositing metal within said second opening to a thickness appreciably greater than that of said first layer; removing said second layer of masking material; removing said metal layer except where covered by said additional metal; and removing said first layer of masking material.

4. In a method of forming a conductive member on a substrate having at least a first portion affixed to said substrate and a second portion uniformly spaced from a surface of said substrate, the steps comprising: forming a pattern of material on said surface that includes a spacer layer between said substrate surface and the position in which said second portion is to be; depositing conductive material in the positions in which both said first and second portions are to be; removing said spacer layer by means that leaves remaining said first and second portions.

5. The subject matter of claim 4 wherein: said depositing of conductive material is also performed in a position in which an additional portion of said conductive member is to be affixed to said substrate and said spacer layer is located between said first portion and said additional portion.

6. The subject matter of claim 4 wherein: said step of depositing conductive material is preceded by forming a mask defining an opening in the positions in which said first and second portions are to be and is followed by the removal of said mask before said removing of said spacer layer.

7. The subject matter of claim 6 wherein: said depositing is by plating and said removing of said spacer layer is by chemical dissolution.

8. The subject matter of claim 7 wherein: said conductive material is gold; prior to said depositing of said conductive material a layer of metal is formed on said surface at least in the position said first portion is to be of a first layer portion immediately adjacent said surface of chromium and a second layer portion remote from said surface of gold.

9. A method of forming a conductive member on a substrate having a first portion affixed to said substrate and a second portion uniformly spaced from the surface of said substrate comprising the steps of: forming a first mask on said surface having a first opening where said first portion of said member is to be affixed and having a uniform thickness underlying the position to be taken by said second portion of said member; evaporating a first metal layer over said first mask and within said first opening, forming a second mask overlying said first mask and having a second opening where said first portion of said member is to be affixed with said opening also extending in the position to be taken by said second portion of said member; evaporating a second metal layer onto the portion of said first metal layer within said second opening and removing that portion of said first metal layer not covered by said second metal layer.

References Cited
UNITED STATES PATENTS

| | | | |
|---|---|---|---|
| 3,539,705 | 11/1970 | Nathanson et al. | 174—68.5 |
| 3,513,022 | 5/1970 | Casterline et al. | 117—212 |
| 3,487,541 | 1/1970 | Boswell | 117—212 X |
| 3,391,457 | 7/1968 | Reimann | 96—36.2 X |
| 3,345,210 | 10/1967 | Wilson | 117—212 |
| 3,240,602 | 3/1966 | Johnson | 96—36.2 |

RALPH S. KENDALL, Primary Examiner

C. WESTON, Assistant Examiner

U.S. Cl. X.R.

117—217; 156—3, 8, 11, 17